US012229941B2

(12) United States Patent
Wang et al.

(10) Patent No.: US 12,229,941 B2
(45) Date of Patent: Feb. 18, 2025

(54) MANUFACTURING METHOD OF A COMPONENT CARRIER, HANDLING SYSTEM, COMPUTER PROGRAM AND SYSTEM ARCHITECTURE

(71) Applicant: AT&S (Chongqing) Company Limited, Chongqing (CN)

(72) Inventors: Yong Wang, Chongqing (CN); Xuebing Wan, Chongqing (CN); Yanxu Chen, Chongqing (CN); Yang Chen, Chengdu (CN); Tao Lin, Chongqing (CN)

(73) Assignee: AT&S (CHONGQING) COMPANY LIMITED, Chongqing (CN)

( * ) Notice: Subject to any disclaimer, the term of this patent is extended or adjusted under 35 U.S.C. 154(b) by 433 days.

(21) Appl. No.: 17/654,533

(22) Filed: Mar. 11, 2022

(65) Prior Publication Data

US 2022/0292660 A1  Sep. 15, 2022

(30) Foreign Application Priority Data

Mar. 12, 2021 (CN) .......................... 202110269628.1

(51) Int. Cl.
*G06N 20/00* (2019.01)
*G01N 21/95* (2006.01)
(Continued)

(52) U.S. Cl.
CPC ............ *G06T 7/001* (2013.01); *G01N 21/95* (2013.01); *G01N 35/00584* (2013.01);
(Continued)

(58) Field of Classification Search
None
See application file for complete search history.

(56) References Cited

U.S. PATENT DOCUMENTS

2008/0174771 A1  7/2008  Yan et al.
2010/0289893 A1  11/2010  Yoo et al.
(Continued)

FOREIGN PATENT DOCUMENTS

CN  106770362 A  5/2017
CN  107209937 A  9/2017
(Continued)

OTHER PUBLICATIONS

English translation of CN-110473170-A. (Year: 2019).*
(Continued)

*Primary Examiner* — Thomas D Lee
(74) *Attorney, Agent, or Firm* — Robert A. Blaha; Smith Tempel Blaha LLC

(57) ABSTRACT

A method for manufacturing a component carrier. The method includes (a) supplying a semifinished or finished component carrier to an automatic or semi-automatic optical inspection device and (b) performing an automatic or semi-automatic optical inspection by capturing a first image with a first illumination; capturing a second image with a second illumination; comparing a data set indicative of the first image and/or the second image with a reference data set; and identifying potential defects; (c) performing a quality classification of the semifinished or finished component carrier by generating a virtual third image indicative of the component carrier under a virtual different third illumination having a third spectral composition different from both the first spectral composition and from the second spectral composition; processing the three images; classifying the potential defects in true defects and false defects; and (d) taking action based on the quality classification. Further described is a system architecture.

19 Claims, 3 Drawing Sheets

(51) Int. Cl.
*G01N 35/00* (2006.01)
*G06T 7/00* (2017.01)
*G06T 11/00* (2006.01)
*G06V 10/764* (2022.01)

(52) U.S. Cl.
CPC .............. *G06N 20/00* (2019.01); *G06T 11/00* (2013.01); *G06V 10/764* (2022.01); *G06T 2207/10152* (2013.01); *G06T 2207/20081* (2013.01); *G06T 2207/30141* (2013.01); *G06V 2201/06* (2022.01)

(56) References Cited

U.S. PATENT DOCUMENTS

| | | | |
|---|---|---|---|
| 2016/0203593 | A1 | 7/2016 | Henkemeyer et al. |
| 2019/0355601 | A1 | 11/2019 | Danen et al. |
| 2020/0098101 | A1 | 3/2020 | Pandey et al. |

FOREIGN PATENT DOCUMENTS

| | | | | |
|---|---|---|---|---|
| CN | 109540899 | A | | 3/2019 |
| CN | 110033035 | A | | 7/2019 |
| CN | 110349114 | A | | 10/2019 |
| CN | 110455822 | A | | 11/2019 |
| CN | 110473170 | A | * 11/2019 | ........... G06K 9/6267 |
| CN | 110678003 | A | | 1/2020 |
| CN | 110865087 | A | | 3/2020 |
| CN | 110911298 | A | | 3/2020 |
| CN | 110992317 | A | | 4/2020 |
| CN | 111054638 | A | | 4/2020 |
| CN | 111079564 | A | | 4/2020 |
| CN | 111492727 | A | | 8/2020 |
| CN | 111551130 | A | | 8/2020 |
| CN | 111788476 | A | | 10/2020 |
| JP | 2020073922 | A | | 5/2020 |
| TW | 202100978 | A | * 1/2021 | |
| TW | 202107073 | A | | 2/2021 |
| WO | 2021027184 | A1 | | 2/2021 |

OTHER PUBLICATIONS

English translation of TW-i691715-B, corresponding to TW-202100978-A. (Year: 2020).*

Mohedano Del Pozo, R.; Extended European Search Report in Application No. EP 22161393.8; pp. 1-12; Aug. 11, 2022; European Patent Office; 80298, Munich, Germany.

IPO Search Report in Taiwan Patent Application 111109046; pp. 1; Aug. 26, 2022.

Office Action in Taiwan Patent Application 111109046; pp. 2; Aug. 26, 2022.

* cited by examiner

MANUFACTURING METHOD OF A COMPONENT CARRIER, HANDLING SYSTEM, COMPUTER PROGRAM AND SYSTEM ARCHITECTURE

CROSS-REFERENCE TO RELATED APPLICATIONS

The present application claims priority to and the benefit of the filing date of Chinese Patent Application No. 202110269628.1, filed Mar. 12, 2021, the disclosure of which is hereby incorporated herein by reference.

TECHNICAL FIELD

The disclosure relates to a method of manufacturing a component carrier, a component carrier, and a system architecture.

TECHNOLOGICAL BACKGROUND

In the context of growing electronic functionalities of component carriers being equipped with one or more electronic components and a steadily increasing miniaturization of such electronic components as well as a rising number of electronic components to be mounted onto a component carrier, e.g., a Printed Circuit Board (PCB), increasingly more powerful array-like components or packages having several electronic components are being employed. Such array-like electronic components have, within a comparatively small area, a plurality of contact terminals, which have to be electrically contacted with corresponding contact pads formed on the component carrier. An array-like component may be for instance a Ball Grid Array (BGA). Its contact terminals are balls, which with increasing miniaturization have an ever smaller spacing between these contact terminals. Further, a removal of heat generated by such electronic components and the component carrier itself during operation becomes an increasing issue. At the same time, component carriers shall be mechanically robust and electrically reliable so as to be operable even under harsh conditions.

In order to produce high quality electronic products, it is important to use high quality component carriers as a mounting base for (surface mounted) electronic components. High quality component carriers are characterized in particular by a spatially precisely defined pattern of contact traces (i) formed at the upper surface of the component carrier as well as (ii) formed by potentially existing inner patterned electrically layers of a multilayer component carrier.

For manufacturing high quality component carriers, it is necessary to perform a quality classification of semifinished component carriers or the finished component carrier on a panel level during a multistep manufacturing process. In the past such a quality classification has often been carried out by human operators. However, the quality classification by human operators is cumbersome and prone to failure.

In order to improve the quality classification of a semifinished component carrier or the finished component carrier it is known to use Artificial Intelligence (AI) systems in combination with an Automatic Optical Inspection (AOI) system to lower the amount, e.g., the number or rate, of false detected defects of the AOI output information. However, the known systems still produce a significant amount of false detected defects.

SUMMARY

There may be a need for reducing the amount of false detected defects which are produced by an AOI based quality classification of a semifinished component carrier when manufacturing the same.

This need may be met by the subject matter according to the present application.

According to a first aspect there is provided a method for manufacturing and/or for checking and/or for testing a component carrier. The provided method comprises (a) supplying a semifinished component carrier or a component carrier to an automatic optical inspection device; and (b) performing an automatic or a semi-automatic optical inspection of the semifinished component carrier or the component carrier by means of the automatic or the semi-automatic optical inspection device. Performing the automatic or the semi-automatic optical inspection comprises the following steps: (b1) capturing a first image of the semifinished component carrier or the component carrier with a first illumination; (b2) capturing a second image of the semifinished component carrier or the component carrier with a second illumination, the first illumination having a first spectral composition being different to a second spectral composition of the second illumination; (b3) comparing an actual data set being indicative of at least one of the first image and the second image with a reference data set being indicative of a reference image for the semifinished component carrier or the component carrier; and (b4) identifying potential defects of the semifinished component carrier or the component carrier based on the result of comparing the actual data set with the reference data set. The provided method further comprises (c) carrying out a quality classification of the semifinished component carrier or the component carrier. Carrying out the quality classification comprises the following steps: (c1) generating, based on at least one of the first image and the second image, a virtual third image of the semifinished component carrier or the component carrier, wherein the third image is indicative of the semifinished component carrier or the component carrier under a virtual third illumination having a third spectral composition being different both to the first spectral composition and to the second spectral composition; (c2) processing the first image, the second image, and the third image by applying artificial intelligence; and (c3) classifying the identified potential defects in true defects and false defects based on the artificial intelligence processing. The provided method further comprises (d) taking an action (solely for the true defects) based on the carried out quality classification.

OVERVIEW OF EMBODIMENTS

The described method is based on the idea that with the additional third image, the data basis, which is used for artificial intelligence processing, is expanded. The expanded data basis may enable the artificial intelligence processing to a more reliable defect classification.

It is pointed out that the mentioned data basis contains data which relate exclusively to the respective (semifinished) component carrier which is investigated with respect to potential defects. This data basis does preferably not contain so called "learned" data, which have been manually or automatically generated before the described method is carried out for a particular (semifinished) component carrier. This means that in accordance with the basic principles of AI the "learned data" may be data which have been generated before based on historical human-based judgements or historical machine self-learned data of previous AI based classifying judgements.

It is pointed out that it is not essential that in practice the described quality classification must be carried out for all semifinished component carriers or component carriers which are processed for manufacturing the (final) component carriers. The quality classification can be restricted to semifinished component carriers or component carriers which are suspected to comprise defects. In other words, without any hindsight towards a presence of defects the respective semifinished component carriers or component carriers can be processed as usual.

The described method may further provide the advantage that the image processing can be realized in real time. The described image processing can be definitely much faster than any human interaction even of a very skilled and very fast operator who is instructed to classify the defects, which have been identified with an AOI device or a semiautomatic automatic optical inspection device. This holds true also for an AOI device or a semiautomatic automatic optical inspection device which is supported by a conventional AI procedure, wherein only real captured images (of the respective semifinished component carrier or the component carrier) are used as a data input.

The described spectral compositions may be defined in any possible color space such as e.g. the widely used RGB or CMYK color space.

The described generation of the virtual third image may be realized by an interpolation or an extrapolation between the first image and the second image on the wavelength scale. For generating the virtual third image of course typical physical (optical) characteristics of the respective semifinished component carrier or component carrier should be taken into account. For doing so, reference can be made to an apriori knowledge, which can be "stored" in a database.

It is mentioned that of course without knowing at least some physical (optical) characteristics of the inspected semifinished component carrier or the inspected component carrier it would be impossible to generate the virtual third image. However, if physical (optical) characteristics are known, it is possible to reconstruct the virtual third image as the "missing color" image. For doing so, it can be taken into account that different materials of the respective supplied semifinished component carrier or component carrier have different signatures in different spectral images. An example of such a reconstructing algorithm is the so-called "sea-thru algorithm" which has been developed by Derya Akkaynak, a mechanical engineer and oceanographer. This algorithm can remove the artefacts and distortions that occur in underwater imagery. "Sea-thru" accounts for image differences under different illumination characteristics and in particular under different spectral illumination characteristics, which differences are based in particular on different spectral scattering behaviors of different optical structures (at the surface of the respective semifinished component carrier or the respective component carrier).

It is further mentioned that it would be also possible to use a (preceding) Artificial Intelligence (AI) method to synthesize the "missing color" image.

In the context of this document, the term "component carrier" may particularly denote any support structure which is capable of accommodating one or more components thereon and/or therein for providing mechanical support and/or electrical connectivity and/or optical connectivity and/or thermal connectivity. In other words, a component carrier may be configured as a mechanical and/or electronic carrier for components. In particular, a component carrier may be one of a printed circuit board, an organic interposer, and an IC (integrated circuit) substrate. A component carrier may also be a hybrid board combining different ones of the above-mentioned types of component carriers.

In the context of this document, the term "automatic optical inspection" may particularly denote an optical monitoring system capturing images of semifinished component carriers or component carriers thereof and inspecting as to whether specific properties of a respective semifinished component carrier or a respective component carrier are in accordance with target properties. For this purpose, the automatic optical inspection unit, which may function independent from human operators, may capture a data set indicative of an image of a semifinished component carrier or a component carrier to be inspected, i.e., a data set indicative of its actual image. Said actual image data may then be compared with a data set indicative of a reference image or target image, i.e., a data set of parameters indicating how the semifinished component carrier or the component carrier should look like to meet a specific specification. A result of such an automatic or semi-automatic optical inspection may be that the semifinished component carrier or the component carrier passes the automatic inspection test or fails the automatic inspection test.

In the context of this document, the term "semi-automatic optical inspection" may correspond to the previous described "automatic optical inspection" with the difference that at least one monitoring and/or inspecting step that function through a partial intervention of human operator, the for example con input data related to one among the component carrier, the defect recognition, the process steps. It is pointed out that in the following description the term "Automatic Optical Inspection (AOI)" does not only mean a fully AOI but also a semi-automatic optical inspection.

It is mentioned that the automatic optical inspection (AOI) may also be carried out in such a way that image data are compared to a data set indicative of defects (i.e., known bad image data) or are compared with known-good and known-bad image data depending on the available training data set used to set up the Artificial Intelligence (AI) software. This approach may be of benefit when there is a certain and absolute limited number of errors/defects that AOI could possibly detect. Descriptively speaking, comparing obtained image data to "known wrong" image data might be helpful to reduce the amount of required computational power required for AI processing as compared to comparing obtained image data to "known-good" image data.

In the context of this document, the term "taking an action" may particularly denote that a certain procedure may be carried out which can be selected from a number of possible actions. The decision which action is to be taken can be made on the basis of the result of the quality classification.

In the context of this document, the term "artificial intelligence" may particularly denote tools such as neural networks, (deep) self-learning or self-adaptive systems, fuzzy logic, etc. Artificial intelligence may operate independently of human beings on the basis of electronic hardware and software resources.

In the context of this document, the term "comparing an actual data set . . . with a reference data set" may particularly denote that, as an image may be defined by gathered data, various parameters and/or measurements deducted from the images or pictures may be compared. It may however also be possible to compare the images or pictures itself or the pixels thereof.

According to an embodiment the step of classifying the identified potential defects comprises classifying the identified potential defects in true defects and false defects. This means that it will be recognized that a potential defect identified with the previous automatic optical inspection (AOI) is not a true defect but only a false defect. Hence, the number of false defects can be reduced which of course reduces the amount of (manual) work which is associated with taking some action in response to a defined defect. In other words, useless work which would be associated with treating false defects, can be avoided and, as a result, the manpower productivity of operators in a component carrier manufacturing plant can be significantly increased.

According to an embodiment the first spectral composition comprises at least one first wavelength, the second spectral composition comprises at least one second wavelength, and the third spectral composition comprises at least one third wavelength which is located, on a wavelength scale, between the first wavelength and the second wavelength.

Descriptively speaking, the third wavelength respectively the third spectral composition may be seen as to represent an interpolation, on the wavelength scale, between the first wavelength and the second wavelength. Such an interpolation between two "extreme" spectral compositions may result in an expanded data basis, which is probably best in improving the reliability of the defect classification. The reason for this "best improvement" may be seen in that in the real world the first "extreme" spectral composition may be highly sensitive for a first type of structures and/or a first type of optical appearances and the second "extreme" spectral composition may be highly sensitive for a different second type of structures and/or a different second type optical appearances, which structures and/or optical appearances may be associated with the potential defect in the respective semifinished component carrier or the respective component carrier. The structures may be any defect related two-dimensional (2D) or three-dimensional (3D) structures. The optical appearances may also be any optical appearances of a surface portion of the respective potential defect. Specifically, a relevant optical appearance may be for instance the color, the reflectivity, the diffusion factor, a gloss value, and a matt factor of the respective surface portion. Of course, the relevant optical appearance may change within the spatial region occupied by the respective potential defect.

According to a further embodiment the first spectral composition comprises red light and the second spectral composition comprises blue light. This may provide the advantage that for illuminating the respective semifinished component carrier or the respective component carrier usual and cheap LED light sources can be used. Since such LED light sources are typically used in currently available and deployed AOI devices the described method can be realized with such AOI devices without the need to make any modification on the hardware side. Hence, the described method can even be realized with prior art AOI devices which are in operation already for a long time. All what is needed is a proper software update with a program causing a data processor to control or execute the described method.

According to a further embodiment the third spectral composition comprises green light. With the generated virtual third green image three color images are used for the artificial intelligence processing, which color images occupy a complete and frequently used color space, namely the RGB color space. This may further contribute to a reduction of the amount of false errors.

It is pointed out that with the described AI processing in the RGB color space a human image processing behavior can be simulated. It has been recognized by the inventors that RGB AI processing yields reliable results for the identification of false defects or false defect alarms.

According to a further embodiment the step of carrying out the quality classification of the semifinished component carrier or the component carrier further comprises, after generating the virtual third image and before processing the first image, the second image, and the third image by applying artificial intelligence, transforming pixel values of at least one of the first image, the second image, and the third image, wherein the processing of the first image, the second image, and the third image is carried out with the transformed pixel values.

With a proper transformation the following AI image processing can be realized in an easy and reliable manner. Commonly available AI algorithm may be employed, which facilitates a software realization of the described method.

The described transforming step may include a normalization of the pixel values. This may provide the advantage that the pixel values to be processed by means of AI technique will be within a precisely defined range. Hence, a potential overexposure as well as a potential underexposure of at least one of the images can be compensated. This may make a further contribution towards a significantly reduced amount of false defects.

According to a further embodiment the step of processing the first image, the second image, and the third image is carried out (solely) with (i) a first group of first sub-images of the first image, (ii) a second group of second sub-images of the second image, and (iii) a third group of third sub-images of the third image. Thereby, each sub-image shows at least one identified potential defect.

The described processing on the basis of groups of sub-images may provide the advantage that regions of the semifinished component carrier or the component carrier, which are free of identified potential defects, may not be used for the AI image processing. Hence, a lot of computational power may be saved. The group of sub-images may also be denominated a batch of sub-images.

According to a further embodiment each group of sub-images is assigned to exactly one semifinished component carrier or one component carrier. This may provide the advantage that the described AI image processing can be carried out individually for each single semifinished component carrier or for each single component carrier. It has turned out that also this type of AI image processing makes a further contribution to towards a small amount of not recognized false defects.

According to a further embodiment each sub-image has a pixel size being smaller than 200×200 pixel and in particular smaller than 100×100 pixel. This may further reduce the amount of required computational power.

It is pointed out that experimental studies carried out by the inventor revealed that even a small pixel size of 60×60 pixel leads to a reliable AI image processing. Surprisingly, also the spatial resolution was sufficient enough in order to clearly identify false defects.

According to a further embodiment the semifinished component carrier or the component carrier is a panel comprising a plurality of individual semifinished component carriers or a plurality of individual component carrier. This may provide the advantage that a plurality of individual semifinished component carriers or component carriers can be manufactured in parallel. In accordance with known PCB manufacturing approaches, the preferably final processed panel can later be singularized into a plurality of individual semifinished component carriers or a plurality of individual component carriers. This parallelization increases, in particular for comparatively small individual component carriers, the throughput of the described component carrier manufacturing method.

Preferably, the described first image and the described second image covers the entire panel or at least a continuous region of the panel within which the individual semifinished component carriers or the individual component carriers are located. Compared to a processing of a plurality of e.g., first images, each showing only the panel region being occupied by only one individual semifinished component carrier or only one component carrier, the described AI image processing of the entire panel yields a significant speed up of the described method. Of course, as has been pointed out above, after identifying the sub-regions of the potential defects the AI image processing may be carried out only with these sub-regions.

In the context of this document, the term "panel" may particularly denote a preform of still integrally connected component carriers as obtained during manufacturing component carriers in a batch procedure. For example, such a panel may comprise a plurality of preforms of component carriers which still form an integral structure, and which may be arranged in rows and columns. It is also possible that the component carriers of a panel are arranged in arrays, for instance each comprising six component carriers. For example, such a panel may have a dimension of 18×12 square inch or 18×24 square inch.

According to a further embodiment the taken action is a continuation of manufacturing the component carrier without intervening process steps.

Taking the decision that no specific procedure needs to be executed involves a very low effort in the component carrier manufacturing process in terms of quality control. In other words, if the quality classification comes to the conclusion that no specific action needs to be taken, the component carrier manufacturing procedure simply proceeds. For instance, the described lack of intervening process steps may relate to taking no extraordinary action or measure, but proceeding with a standard or predefined default process flow. Continuation of processing may occur without intervening process steps, without human intervention, without human intervention in case of no true faults, etc.

In an embodiment, the method comprises taking the action of continuing manufacturing the component carrier without intervention when the quality classification indicates no real or true defect of the semifinished component carrier or the component carrier. In other words, when the quality classification comes to the conclusion that the semifinished component carrier or the component carrier has no true defect, no specific action needs to be taken apart from the continuation of the ordinary manufacturing process.

In an embodiment, the method comprises taking the action of continuing manufacturing the component carrier without intervention when the quality classification indicates an unrepairable defect of the respective semifinished component carrier or the respective component carrier. Hence, classifying a respective semifinished component carrier or a respective component carrier as to be non-repairable, since for instance at least one true defect has been identified which cannot be repaired or cannot be repaired with reasonable effort, may result in considering this semifinished component carrier or this component carrier as a final fail. In this case, the manufacturing method may proceed with a processing of another semifinished component carrier or another component carrier, and the unrepairable semifinished component carrier or the unrepairable component carrier will not be used at the end of the manufacturing process.

According to a further embodiment the taken action comprises repairing the semifinished component carrier or the component carrier when the quality classification indicates a repairable true defect of the semifinished component carrier or the component carrier.

The described repair may be a proper action if a true defect is of such a nature that it can be repaired by an automatic repair process or (easily) by a human operator. By taking this measure, the yield of the component carrier manufacturing process may be improved. When a reparable defect is identified by the quality classification, the semifinished component carrier or the component carrier is classified correspondingly and a repair of the same may be carried out. After a successful repair, a classification of the entire semifinished component carrier or the entire component carrier may be changed from fail to pass.

In an embodiment, the repair comprises at least one of the group consisting of a separation of erroneously connected traces, a connection of erroneously separate traces, a repair of an erroneous solder structure, and a repair of an erroneous core. For example, electrically conductive traces of a semifinished component carrier or a component carrier, which are erroneously connected, may be separated by a laser or a cutting blade which can be operated automatically or under control of a human operator. Also, an undesired separation of different traces of a semifinished component carrier or a component carrier may be repaired by connecting them, for instance by putting a solder spot or any electrically conductive paste to a portion where two traces are erroneously disconnected. When for instance a solder structure is simply missing or has an erroneously small volume, additional solder material may be applied to said specific defect portion by a human operator or automatically e.g., by an appropriate robot. Even when a core, i.e., a fully cured plate shaped central structure of a semifinished component carrier or a component carrier, has been identified, it may be repaired to avoid loss of an entire component carrier. Also, such a repair procedure can be carried out automatically or manually by a human operator.

According to a further embodiment the method further comprises classifying the true defects by indicating a type of defect among a number of predefined types of defects.

The types of defects may be for instance an erroneous connection of conductor traces of a patterned electrically conductive layer, an erroneous separation of conductor traces, an insufficient amount of solder, an excessive amount of solder, etc. Providing a list of frequently occurring defects, from which an identified defect may be selected, may streamline the process of defect handling and in particular a defect repair.

According to a further embodiment the method is carried out completely without involving the interaction of a human operator. This means that the described method may be accomplished in a way that no human interference is necessary at all. It has turned out that, after a certain number of learning cycles, the quality classification on the basis of AI may make even better classifications than a human operator. By avoiding any human interaction the manufacturing process of the component carrier may be streamlined, and the throughput and yield in component carrier manufacture may be improved.

According to a further embodiment the first image, the second image, and the virtual third image comprise two-dimensional images. This may provide the advantage that the automatic optical inspection device may be realized with at least one simple 2D camera. It has turned out that for many applications it is sufficient to do the comparing of the actual data set with the reference data set and also the subsequent AI image processing in solely two dimensions. Hence, the described method can be carried out with a comparatively small amount of computational power.

According to a further embodiment the first image, the second image, and the virtual third image comprises a three-dimensional image. This may provide the advantage that more details about potential defects may be captured and further processed. Highly advantageously, the images comprise both a two-dimensional image and a three-dimensional image. Hence, the further processing as defined by the described method involves a combined 2D and 3D analysis in the quality classification.

According to a further embodiment the step of performing the automatic or semi-automatic optical inspection and the step of carrying out the quality classification is done after patterning a metal layer for forming electrically conductor traces of the semifinished component carrier or the component carrier for assessing a quality of the formed conductor traces. This may provide the advantage that directly after such a patterning procedure, the success of the latter may be assessed by the automatic optical inspection followed by a quality classification in the front-end. In case of a multilayer component carrier to be manufactured such a procedure may be repeated for each patterned layer.

According to a further embodiment processing by applying artificial intelligence and/or processing artificial intelligence comprises updating the processing by data inputted from a user via a user interface device.

In some applications, an AI module for or of an AOI device for performing the AOI of the semifinished component carrier or the component carrier may be continuously improved by a proper training of such an AI module. Thereby, a proper training may also include a self-training.

The described AOI of the semifinished component carrier or the component carrier may be based on a big data approach, i.e., the more data will be supplied to the AI module, the more efficiently and accurately the AOI will work. In this context, exemplary embodiments provide an efficient solution for classifying defects of a semifinished component carrier or a component carrier already during manufacturing of a component carrier. In particular, a reliable classification of identified potential defects may be provided. For this approach, the AI module may have a user-friendly interface and may be easily operable and implementable. In particular, the AI module may allow to classify, in a reliable manner, the potential defects in terms of true and false defects.

It is pointed out that in case a potential defect cannot fully be recognized by the AI module as a true or false defect, this classification can be accomplished with the aid of a human operator. For instance, through a suitable user interface, e.g., provided on processing equipment or on any suitable remote interface such as a connected mobile device, a human operator can be inquired by the AI module and depending on human operator's feedback, e.g., confirming the potential defect as a true defect or classifying the potential defect as a false defect, the AI module can properly update its evaluation logic in order to better judge this kind of defects in the future based on the information of the human operator's feedback.

In an embodiment, a processing by the AI module comprises a processing by a neural network. Such a neural network may be a computing system which may be capable of learning to perform tasks by considering examples, generally without being programmed with task-specific rules. A neural network may be based on a collection of connected nodes called artificial neurons. Each connection between said neurons can transmit a signal to other neurons. An artificial neuron that receives a signal then processes it and can signal neurons connected to it. During learning, the potential defect can be identified and classified accurately. By inputting images of the semifinished component carrier or the component carrier, the neural network can reliably classify each one of the potential defects as a true defect or as a false defect.

According to a further embodiment processing by applying artificial intelligence and/or processing artificial intelligence comprises updating the processing by machine learning, in particular by deep learning.

The term "deep learning" may particularly denote a machine learning procedure based on artificial neural networks with representation learning. Deep learning can be supervised, semi-supervised or unsupervised. Examples of deep learning architectures, which may be implemented according to exemplary embodiments, are deep neural networks, deep belief networks, recurrent neural networks and convolutional neural networks. The implementation of deep learning algorithms in the determination of an action plan for classifying the potential defects of the semifinished component carrier or the component carrier may further improve the efficiency and the ability of the AOI.

According to a further embodiment updating the processing by machine learning comprises storing data during processing by machine learning for training the artificial intelligence.

The data obtained during carrying out the method may be used for training a neural network of the AI module. For instance, the data may be stored as training data in an appropriate database and may be used for training the above-mentioned AI module. By introducing such data from previous component carrier defects identification routines into the AI module, the performance of the AI module (for instance of a neural network thereof) may be continuously improved. In other words, the output of the AOI of the semifinished component carrier or the component carrier may be synergistically used as highly valuable training data for the AI module. The output of the AI module may be made subject of a further iteration using again the AI module.

According to a further aspect there is provided a system for handling a semifinished component carrier during manufacturing of a component carrier. The provided system comprises (a) a device configured for supplying or transporting a semifinished component carrier or a component carrier to an automatic or semi-automatic optical inspection device and (b) the automatic or semi-automatic optical inspection device for performing an automatic or semi-automatic optical inspection of the semifinished component carrier or the component carrier. The automatic or semi-automatic optical inspection device is configured for (b1) capturing a first image of the semifinished component carrier or the component carrier with a first illumination; (b2) capturing a second image of the semifinished component carrier or the component carrier with a second illumination, the first illumination having a first spectral composition being different to a second spectral composition of the second illumination; (b3) comparing an actual data set being indicative of at least one of the first image and the second image with a reference data set being indicative of a reference image for the semifinished component or the component carrier; and (b4) identifying potential defects of the semifinished component carrier or the component carrier based on the result of comparing the actual data set with the reference data set. The provided system further comprises (c) a data processing device, communicatively coupled with the automatic or semi-automatic optical inspection device, for carrying out a quality classification of the semifinished product. The data processing device is configured for (c1) generating, based on at least one of the first image and on the second image, a virtual third image of the semifinished component carrier, wherein the third image is indicative of the semifinished component carrier or the component carrier under a virtual third illumination having a third spectral composition being different both to the first spectral composition and to the second spectral composition; (c2) processing the first image, the second image, and the third image by applying artificial intelligence; and (c3) classifying the identified potential defects in true defects and false defects based on the artificial intelligence processing. The provided system further comprises (d) an executing device for taking a (physical) action (solely for the true defects) based on the carried out quality classification.

Also, the described system is based on the idea that with the additional third image the data basis, which is used for artificial intelligence processing, is expanded. The expanded data basis may enable the artificial intelligence processing to more reliably recognize that a potential defect identified with the previous AOI procedure is not a true defect but only a false defect.

The described transport device may be realized by any conveying system which is designed to supply the semifinished component carrier or the component carrier to the automatic optical inspection device along a straight or curved transport path.

According to a further aspect there is provided a computer program for manufacturing a component carrier. The computer program, when being executed by one or a plurality of processors, a data processor, is adapted for controlling and/or for carrying out the above-described method for manufacturing a component carrier.

As used herein, reference to a computer program is intended to be equivalent to a reference to a program element and/or to a computer-readable medium containing instructions for controlling a computer system to coordinate the performance of the above-described method. The computer program may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

Embodiments of the invention may be realized by means of a computer program respectively software. However, embodiments of the invention may also be realized by means of one or more specific electronic circuits respectively hardware. Furthermore, embodiments of the invention may also be realized in a hybrid form, i.e., in a combination of software modules and hardware modules. The embodiments described in this document may also be realized in connection with a "CLOUD" network which provides the necessary virtual memory spaces and the necessary virtual computational power.

According to a further aspect there is provided a system architecture for classifying defects of a semifinished component carrier or the component carrier during manufacturing of a component carrier. The provided system architecture can be used for classifying defects when manufacturing a component carrier in particular by means of the method as described above. The provided system architecture comprises (a) an automatic or semi-automatic optical inspection system for performing an automatic or semi-automatic optical inspection of the semifinished component carrier or the component carrier. The automatic or semi-automatic optical inspection system comprises (a1) an automatic or semi-automatic optical inspection device configured for capturing at least one image of the semifinished component carrier or the component carrier, and (a2) a data processing device configured for (i) receiving the at least one captured image, (ii) comparing an actual data set being indicative of the at least one captured image with a reference data set being indicative of a reference image for the semifinished component carrier or the component carrier, and (iii) identifying potential defects of the semifinished component carrier or the component carrier based on the result of comparing the actual data set with the reference data set. The provided system architecture further comprises (b) a standardized data interface and (c) an application system comprising (c1) at least one application server, which is communicatively coupled with the automatic or semi-automatic optical inspection system via the standardized data interface for exchanging image information relating to the at least one captured image and to the identified potential defects, wherein the at least one application server is configured for processing the image information. The provided system architecture further comprises (d) an artificial intelligence (AI) system comprising at least one AI server, which is communicatively coupled with the application system for exchanging the image information with the application server, wherein the at least one AI server is configured for (i) processing the exchanged image information, (ii) classifying, based on artificial intelligence processing, the identified potential defects into true defects and false defects, and (iii) exchanging information about true defects and false defects at least with the application server.

The described system architecture is based on the idea that a defect classification in true defects respectively in false defects based on AI processing can be realized with information technology (IT) equipment which can be logically and/or physically separated from the automatic optical inspection (AOI) system or semi-automatic optical inspection system by means of the described standardized interface. This standardized interface provides the described system architecture with a modularity with regard to the AOI equipment of the employed AOI system. Since this AOI equipment can be obtained from different AOI equipment suppliers the described system architecture can be used for respectively realized with different types of AOI systems. This may provide the advantage that for the described system architecture one and the same IT architecture can be used for different AOI systems without needing to adapt the IT architecture. This makes the described system architecture highly flexible. Specifically, without any IT architecture reconfiguration it can be used for many different types of AOI systems, which may be provided from different AOI equipment supplier. Hence, for each specific semifinished component carrier or each specific component carrier inspection and defect identification the best AOI system can be selected. Due to the standardized interface, for instance in connection with a change of the type of semifinished component carrier for manufacturing a component carrier, an AOI system can be quickly and easily exchanged with another AOI system being more appropriate for the new type of semifinished component carrier.

The at least one AI server may be configured for operating based on the so called "deep learning" approach. This allows to provide a high reliability with regard to (i) confirming the true defects and/or in particular with regard to (ii) recognizing the false defects. Since with known AOI systems there is often a rate of 90% false defects there is a significant (manual) effort in order to handle not only the true defects but also these false defects and recognize them as to be false defects. With the described system architecture this useless and unprofitable amount or workload can be avoided. Hence, the overall production of component carriers and in particular of multilayer component carriers can be made much more efficient.

The standardized interface may be any type data interface which represents a "standard" at least for the AOI system and the application system. Thereby, known or dedicated standards may be used. It is only essential that the standardized interface is not only compatible with the application server/system but also for at least two different AOI systems.

It is mentioned that it is not required that (i) the image information exchanged between the AOI system and the application system via the standardized interface and (ii) the image information exchanged between the application system and the AI system have the same data format. Further, it is even not necessary that they are (completely) identical with regard to the information content. However, it is essential that the described two image information carry at least partially the same information content, wherein this (overlapping) information content comprises the actual data set of the respective captured image and a certain kind of labeling whether this captured image contains at least one defect. Descriptively speaking, the AOI system provides the AI system with the information about potential defects in a captured image and the AI system informs at least the application server about the presence or existence of any false defect.

It is pointed out that the described system architecture is able to, after the AI system has been trained, provide the information about false defects in real time. This is a great advantage for the efficiency of the manufacture of component carriers because there will be no delays associated with regard to a detection of false defects.

According to a further embodiment the system architecture further comprises a control system, which is communicatively coupled with the application system and which is configured for (i) storing identity (ID) information of a plurality of individual semifinished component carriers or individual component carriers, (ii) receiving AOI or semiautomatic optical inspection measurement results at least for the semifinished component carrier or the component carrier, wherein the AOI measurement results or the semiautomatic inspection measurement results include information about the identified potential defects, (iii) receiving the information about true defects and false defects at least for the semifinished component carrier or the component carrier, and (iv) assigning the received AOI measurement results and the received information about true defects and false defects to the stored ID information.

With the described control system a correct assignment of all technical information, which has either been directly measured or which has been calculated by the data processing device of the AOI system and/or by the AI server of the AI system, can be correctly attributed to the respective (semifinished) component carrier. Thereby, (manual) input information from an operator or user might also be taken into account.

In some embodiments the described control system also comprises a so-called manufacturing execution system (MES), which tracks and which documents any transformation of raw materials and/or the semifinished component carrier or the component carrier in its various processing stages. Further, the described control system may also comprise an Enterprise Resource Planning (ERP) computing entity, which runs a software to manage business operations and customer relations. The software may provide an integrated and continuously updated view of not only the technical processes but also of core business processes using common databases maintained by a database management system. The MES and/or the ERP computing entity may be realized in hardware, in software or in any combination of hardware and software.

According to a further embodiment the described system architecture further comprises a data storage system, which is communicatively coupled with the application system and which is configured for storing labeled image information for a plurality of semifinished component carriers or for a plurality of component carriers. Thereby, each labeled image information comprises (i) the image information relating to the at least one captured image and to the identified potential defects and (ii) label information being indicative, for each identified potential defect, whether it is a false defect (or a true defect).

The described data storage system may allow to collect information about false defects, which has been obtained (so far) by the AI system, for a plurality of AI judgements, which have been made so far. Since this information, which in this document is denominated label information, is associated in particular with the respective captured image, the data set being available for an improved (deep) learning by the AI system can be continuously expanded.

According to a further embodiment the automatic optical inspection system further comprises an AOI data storage device for storing, for each of a plurality of captured images, the associated label information received from the data storage system (via the application system).

The AOI data storage device may be realized with a so-called Image Management System (IMS). Known software applications can be used for the IMS.

Further, the described AOI data storage device may be communicatively connected with a workstation or a workplace at which an appropriate treatment of the respective (semifinished) component carrier having a (real) true defect can be carried out. As has already been mentioned above, such a treatment may be for instance an automatic or a manual repair of such a true defect. In some embodiments, such a workstation may also allow for an additional human verification of the true defect.

In the following, further embodiments and technological considerations relating to the described method for manufacturing a component carrier and to the described system for handling a semifinished component carrier during manufacturing of a component carrier will be described.

In an embodiment, the semifinished component carriers or the component carriers comprise a stack of at least one electrically insulating layer structure and at least one electrically conductive layer structure. In the context of the present application, the term "layer structure" may particularly denote a continuous layer, a patterned layer or a plurality of non-consecutive islands within a common plane. A layer structure may be electrically insulating and/or electrically conductive. For example, the (semifinished) component carrier may be a laminate of the mentioned electrically insulating layer structure(s) and electrically conductive layer structure(s), in particular formed by applying mechanical pressure and/or thermal energy. The mentioned stack may provide plate-shaped component carriers capable of providing a large mounting surface for further components and being nevertheless very thin and compact.

In an embodiment, the semifinished component carrier or the component carrier is shaped as a plate. This contributes to the compact design, wherein the final component carrier nevertheless provides a large basis for mounting components thereon. Furthermore, in particular a naked die as example for an embedded electronic component, can be conveniently embedded, thanks to its small thickness, into a thin plate such as a printed circuit board. A plate-shaped component carrier also ensures short electric connection paths, and therefore suppresses signal distortion during transport. In an embodiment, the final component carrier is configured as one of the group consisting of a printed circuit board, a substrate (in particular an IC substrate), and an interposer.

In the context of this document, the term "printed circuit board" (PCB) may particularly denote a plate-shaped component carrier which is formed by laminating several electrically conductive layer structures with several electrically insulating layer structures, for instance by applying pressure and/or by the supply of thermal energy. As preferred materials for PCB technology, the electrically conductive layer structures are made of copper, whereas the electrically insulating layer structures may comprise resin and/or glass fibers, so-called prepreg or FR4 material. The various electrically conductive layer structures may be connected to one another in a desired way by forming through-holes through the laminate, for instance by laser drilling or mechanical drilling, and by filling them with electrically conductive material (in particular copper), thereby forming vias as (vertical) through-hole connections. Apart from one or more components which may be embedded in a PCB, a PCB is usually configured for accommodating one or more components on one or both opposing surfaces of the plate-shaped PCB. They may be connected to the respective main surface by soldering. A dielectric part of a PCB may be composed of resin with reinforcing fibers (such as glass fibers).

In the context of this document, the term "substrate" may particularly denote a small component carrier. A substrate may be a, in relation to a PCB, comparably small component carrier onto which one or more components may be mounted and that may act as a connection medium between one or more chip(s) and a further PCB. For instance, a substrate may have substantially the same size as a component (in particular an electronic component) to be mounted thereon (for instance in case of a Chip Size Package (CSP)). More specifically, a substrate can be understood as a carrier for electrical connections or electrical networks as well as component carrier comparable to a printed circuit board (PCB), however with a considerably higher density of laterally and/or vertically arranged connections. A lateral connection is for example a conductive path, whereas a vertical connection may be for example drill holes. These lateral and/or vertical connections are arranged within the substrate and can be used to provide electrical and/or mechanical connections of housed components or unhoused components (such as bare dies), particularly of IC chips, with a printed circuit board or intermediate printed circuit board. Thus, the term "substrate" also includes "IC substrates". A dielectric part of a substrate may be composed of resin with reinforcing particles (such as reinforcing spheres, in particular glass spheres).

The substrate or interposer may comprise or consist of at least a layer of glass, silicon (Si) or a photoimageable or dry-etchable organic material like epoxy-based build-up material (such as epoxy-based build-up film) or polymer compounds like polyimide, polybenzoxazole, or benzocyclobutene.

In an embodiment, each of the above-mentioned electrically insulating layer structures comprises at least one of the group consisting of resin (such as reinforced or non-reinforced resins, for instance epoxy resin or bismaleimide-triazine resin), cyanate ester, polyphenylene derivate, glass (in particular glass fibers, multi-layer glass, glass-like materials), prepreg material (such as FR-4 or FR-5), polyimide, polyamide, liquid crystal polymer (LCP), epoxy-based build-up film, polytetrafluoroethylene (Teflon®), a ceramic, and a metal oxide. Teflon® is a registered mark of The Chemours Company FC LLC of Wilmington, Delaware, U.S.A. Reinforcing materials such as webs, fibers or spheres, for example made of glass (multilayer glass) may be used as well. Although prepreg particularly FR4 are usually preferred for rigid PCBs, other materials in particular epoxy-based build-up film for substrates may be used as well. For high frequency applications, high-frequency materials such as polytetrafluoroethylene, liquid crystal polymer and/or cyanate ester resins, low temperature cofired ceramics (LTCC) or other low, very low or ultra-low DK materials may be implemented in the component carrier as electrically insulating layer structure.

In an embodiment, each of the above-mentioned electrically conductive layer structures comprises at least one of the group consisting of copper, aluminum, nickel, silver, gold, palladium, and tungsten. Although copper is usually preferred, other materials or coated versions thereof are possible as well, in particular coated with supra-conductive material such as graphene.

In an embodiment, the semifinished component carrier or the component carrier further comprises an electronic component mounted on and/or embedded in the component carrier material, in particular in the stack. For instance, the electronic component may be a radio-frequency semiconductor chip configured for emitting and/or receiving radio-frequency signals via the wiring structures and being electrically coupled with the electrically conductive wiring structures. Hence, the electronic component may be configured for executing a radio-frequency application, in particular a radio-frequency application involving frequencies above 1 GHz.

At least one component may be surface mounted on and/or embedded in the component carrier and can in particular be selected from a group consisting of an electrically non-conductive inlay, an electrically conductive inlay (such as a metal inlay, preferably comprising copper or aluminum), a heat transfer unit (for example a heat pipe), a light guiding element (for example an optical waveguide or a light conductor connection), an optical element (for instance a lens), an electronic component, or combinations thereof. For example, the component can be an active electronic component, a passive electronic component, an electronic chip, a storage device (for instance a DRAM or another data memory), a filter, an integrated circuit, a signal processing component, a power management component, an optoelectronic interface element, a light emitting diode, a photocoupler, a voltage converter (for example a DC/DC converter or an AC/DC converter), a cryptographic component, a transmitter and/or receiver, an electromechanical transducer, a sensor, an actuator, a microelectromechanical system (MEMS), a microprocessor, a capacitor, a resistor, an inductance, a battery, a switch, a camera, an antenna, a logic chip, and an energy harvesting unit. However, other components may be embedded in the component carrier. For example, a magnetic element can be used as a component. Such a magnetic element may be a permanent magnetic element (such as a ferromagnetic element, an antiferromagnetic element, a multiferroic element or a ferrimagnetic element, for instance a ferrite core) or may be a paramagnetic element. However, the component may also be a substrate, an interposer or a further component carrier, for example in a board-in-board configuration. The component may be surface mounted on the component carrier and/or may be embedded in an interior thereof.

In an embodiment, the (semifinished) component carrier is a laminate-type component carrier. In such an embodiment, the component carrier is a compound of multiple layer structures which are stacked and connected together by applying a pressing force and/or heat.

After processing interior layer structures of the semifinished component carriers or the component carriers, it is possible to cover (in particular by lamination) one or both opposing main surfaces of the processed layer structures symmetrically or asymmetrically with one or more further electrically insulating layer structures and/or electrically conductive layer structures. In other words, a build-up may be continued until a desired number of layers is obtained.

After having completed formation of a stack of electrically insulating layer structures and electrically conductive layer structures, it is possible to proceed with a surface treatment of the obtained layer structures or component carrier. In particular, an electrically insulating solder resist may be applied to one or both opposing main surfaces of the layer stack or component carrier in terms of surface treatment. For instance, it is possible to form such as solder resist on an entire main surface and to subsequently pattern the layer of solder resist so as to expose one or more electrically conductive surface portions which shall be used for electrically coupling the component carrier to an electronic periphery. The surface portions of the component carrier remaining covered with solder resist may be efficiently protected against oxidation or corrosion, in particular surface portions containing copper.

It is also possible to apply a surface finish selectively to exposed electrically conductive surface portions of the component carrier in terms of surface treatment. Such a surface finish may be an electrically conductive cover material on exposed electrically conductive layer structures (such as pads, conductive tracks, etc., in particular comprising or consisting of copper) on a surface of a component carrier. If such exposed electrically conductive layer structures are left unprotected, then the exposed electrically conductive component carrier material (in particular copper) might oxidize, making the component carrier less reliable. A surface finish may then be formed for instance as an interface between a surface mounted component and the component carrier. The surface finish has the function to protect the exposed electrically conductive layer structures (in particular copper circuitry) and enable a joining process with one or more components, for instance by soldering. Examples for appropriate materials for a surface finish are Organic Solderability Preservative (OSP), Electroless Nickel Immersion Gold (ENIG), gold (in particular Hard Gold), chemical tin, nickel-gold, nickel-palladium, etc.

It has to be noted that embodiments have been described with reference to different subject matters. However, a person skilled in the art will gather from the above and the following description that, unless other notified, in addition to any combination of features belonging to one type of subject matter also any combination between features relating to different subject matters is considered as to be disclosed with this document.

The aspects defined above and further aspects of the present technology are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF ILLUSTRATED EMBODIMENTS

Figure 1:
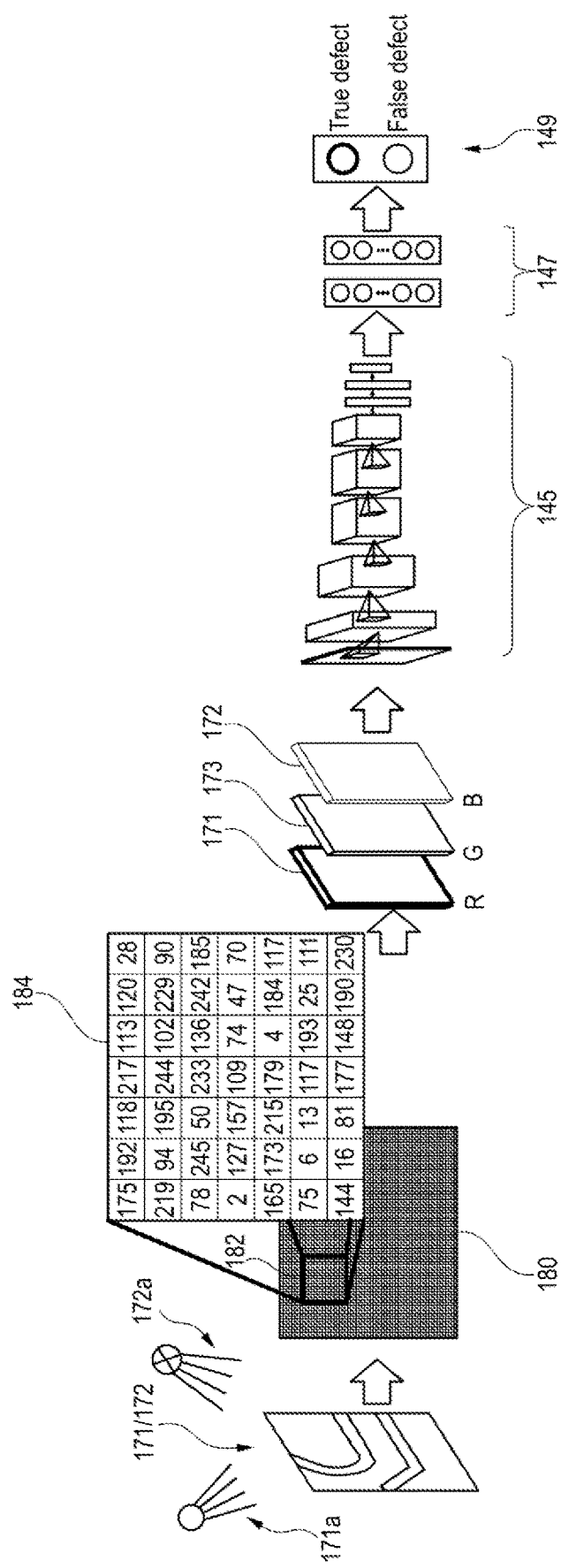
FIG. 1 illustrates an algorithm for AI processing of an AOI captured image in order to identify false defects on a semifinished component carrier.

The illustrations in the drawings are schematically presented. It is noted that in different figures, similar or identical elements or features are provided with the same reference signs or with reference signs, which are different from the corresponding reference signs only within the first digit. In order to avoid unnecessary repetitions, elements or features, which have already been elucidated with respect to a previously described embodiment, are not elucidated again at a later position of the description.

FIG. 1 illustrates an algorithm for AI processing of an AOI captured image for identifying false defects, which have been detected by a non-depicted AOI device on the surface of a semifinished component carrier. The described algorithm, which may rely on an AOI defect detection, can be carried out for each layer of a multilayer component carrier. Such a multilayer component carrier can be produced by sequentially laminating electrically conductive layer structures and electrically insulating layer structure onto each other in an alternating sequence. Since the process for manufacturing a multilayer component carrier is well known to the skilled person, details about this process are not elucidated in this document.

The described AI processing algorithm starts with capturing images from the surface of a semifinished component carrier 180, wherein in accordance with known AOI defect identification several partial images of the entire surface of the semifinished component carrier 180 are provided. Thereby, each one of these partial images has been preferably considered, by the AOI device, as to include at least one defect in particular on a patterned electrically conductive layer. Such a defect can be for instance an erroneous connection of conductor traces of the patterned electrically conductive layer or an erroneous separation of conductor traces.

In accordance with the described algorithm the AOI device provides, for each supposed or potential defect region 182, two AOI images, a first AOI image 171 and a second AOI image 172. The first AOI image 171 has been captured with a first illumination light 171a having a first spectral composition. According to the embodiment described here the first illumination 171a comprises red light. The second AOI image 172 has been captured with a second illumination 172a having a second spectral composition. According to the embodiment described here the second illumination 172a comprises blue light.

Each one of the two AOI images 171 and 172 is preferably represented by a data set 184, which comprises for each pixel of the two AOI images 171, 172 a captured (greyscale) value. According to the embodiment described here the two images have a pixel number being 60×60=3600 pixels. This comparatively small number, which of course corresponds with a comparatively small spatial resolution of the two images 171, 172, which each show only a subregion of the entire surface of the semifinished component carrier 180, allows to realize the described algorithm with a small computational effort and within a real-time processing.

At this point it is mentioned that of course the two images 171 and 172 could also show not only a subregion but the entire surface of the semifinished component carrier 180. However, when further processing images, which show the entire surface, the required computational resources for the following neural network processing will be significantly increased. Further, using the entire surface of the semifinished component carrier, wherein only comparatively small subregions show potential defects, would make the training and recognizing processes of the neural network processing difficult because, put in simple words, the neural network does not know where to look at. Hence, the neural network will pick up irrelevant features of the image 171 and/or the image 172. Apart from increasing the computational effort these irrelevant features may also cause the neural network processing to be less reliable.

The described algorithm proceeds with generating, based on at least one of the first AOI image 171 and on the second AOI image 172, a virtual third image (of the subregion) of the semifinished component carrier 180. The virtual third image comprises a representation of the respective subregion under a virtual third illumination, which has a third spectral composition being different both to the first spectral composition and to the second spectral composition. According to the embodiment described here the third spectral composition comprises (virtual) green illumination light.

The basic principles of generating the virtual third image has been described above and, for the sake of conciseness of this document, are not repeated here again.

According to the embodiment described here, before generating the virtual third image, there has been carried out an optional normalization of the pixel values of the first AOI image 171 and the second AOI image 172. With this normalization the pixel values are transformed to normalized values. The normalized values make it easier to further process the three images.

As can be taken from FIG. 1, the described algorithm proceeds with an AI processing of the three images. This AI processing includes a first AI processing 145, which is carried out with (conventional) convolution neural networking involving a plurality of AI layers. In a second AI processing 147 the results of the different layers respectively the neural nodes of each layer are logically interconnected with each other with a so called full connect networking. The basic principle of these types of AI processing are well known to the skilled person and are therefore, for the sake of conciseness of this document, not explained in detail.

The outcome of the AI processing 145 and 147 is a defect classification 149, which comprises an improved identification of each potential defect, which has been identified before by the AOI device with known but less reliable AOI defect identification image processing, whether this defect it is true defect or a false defect. This allows for removing the false defects from a defect list which is used for reworking the respective semifinished component carrier. It is obvious that such a consolidated list, which only shows defects, which are true defects and which has only a very small number of false defects, significantly reduces the workload for a proper post processing. By avoiding the post processing workload connected with false defects the entire component carrier manufacturing will be more effective.

Figure 2:
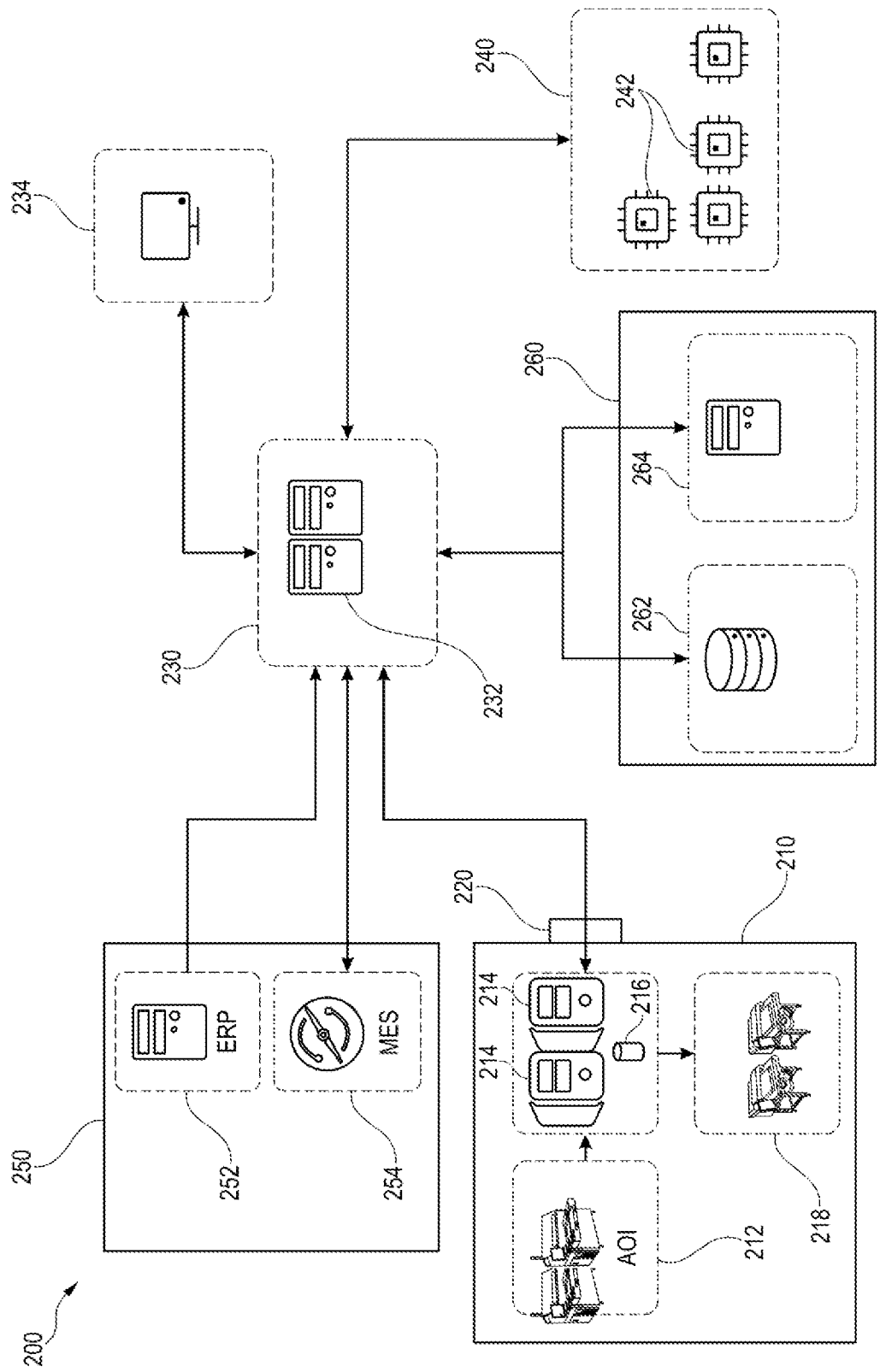
FIG. 2 shows a system architecture for AI classifying defects of a semifinished component carrier during manufacturing of a component carrier.

FIG. 2 shows a system architecture 200 for AI classifying defects of a semifinished component carrier during manufacturing of a component carrier. The system architecture 200 comprises an AOI system 210, which comprises a known AOI device 212, an AOI data processing device 214, and an AOI data storage device 216. The AOI device 212 may be a commercially available AOI device 212. In accordance with embodiments of the invention the AOI device 212 is configured for performing an automatic optical inspection of the semifinished component carrier, wherein two images are captured from the respective semifinished component carrier under different illumination conditions. As has been mentioned already above, a first illumination light being used for capturing the first image comprises a red light and a second illumination light being used for capturing the second image comprises a blue light.

The two generated images are provided to the AOI data processing device 214. According to the embodiment described here the AOI data processing device 214 represents an Image Management System (IMS) which is configured for managing a plurality of respectively two images captured from different semifinished component carriers. The AOI data storage device 216 at least temporarily stores these images. The AOI data processing device 214 is configured for identifying, on each semifinished component carrier, which has been inspected by the AOI device 212, potential defects.

According to the embodiment described here and in accordance with known AOI systems 210, the AOI data processing device 214 is communicatively coupled with a workstation 218, at which or with which a repair of (true defects) at the surface of a semifinished component carrier can be carried out. As has already been mentioned above, a high number of false defects, which are typically reported by the AOI data processing device 214, increase the workload for post processing a potentially defect semifinished component carrier. In this document, the workstation 218 is also referred to as a Verification Repair System (VRS).

In order to reduce this completely useless workload, which is associated with handling false defects, the described system architecture 200 comprises a standardized data interface 220, which allows for an (external) identification of false defects. Specifically, according to the embodiment described here, information about (a) the captured images (e.g., the greyscale pixel values of the images) and (b) the (potential) defects identified by the AOI system 210 are forwarded to an application system 230, which comprises at least one application server 232. An optional client computer 234 is connected to the application system 230 in order to allow an operator to control and/or to monitor the defect classification and/or the entire AOI processing by means of the described system architecture 200 even from a remote location.

As can be taken from FIG. 2, the described system architecture 200 further comprises a control system 250, which comprises an Enterprise Resource Planning (ERP) server 252 and a Machine Execution System (MES) 254. The ERP server 252 and the MES 254 are used for correlating and/or aligning the AI assisted AOI defect identification (information) with logistic data of the entire component carrier manufacturing process. These logistic data may include for instance lot numbers, identification numbers (for each semifinished and/or final component carrier), information about the responsible operator, etc. This logistic data may be used for instance for a traceability of all steps of the entire component carrier manufacturing process.

The described system architecture 200 further comprises an AI system 240 and a data storage system 260. Both the AI system 240 and the data storage system 260 are communicatively connected with the application system 230. The AI system 240 preferably comprises several AI servers 242, which are configured for performing a deep learning AI processing. The data storage system 260 comprises, according to the embodiment described here, an SQL data storage 262 and a file server 264.

During operation of the described system architecture 200, the application system 230 receives, via the standardized data interface 220, from the AOI system 210 the captured images together with the information about potential defects (in each image), which have been identified by the AOI data processing device 214 of the AOI system 210. All this information is forwarded to the AI system 240, which is capable of identifying the false defects of the potential defects.

The information about the false defects is transferred back to the application system 230. Thereby, for each image, (i) defects, which have been turned out to be false defects and/or defects, which have been turned out to be true defects, are labelled in an appropriate manner. The labelled images are stored in the data storage system 260. Stored labelled images can later, at any time, be used for improving the training of the deep learning AI system 240.

The information about the false defects and/or about the true defects is further transferred to the AOI system 210 (via the standardized data interface 220). Here, the false defect information is used for informing (an operator of) the workstation 218 about the false defects, which have been identified by the AOI data processing device 214. Hence, (the operator of) the workstation 218 is "unburdened" from the false defects and can concentrate for post processing the true defects.

Figure 3:
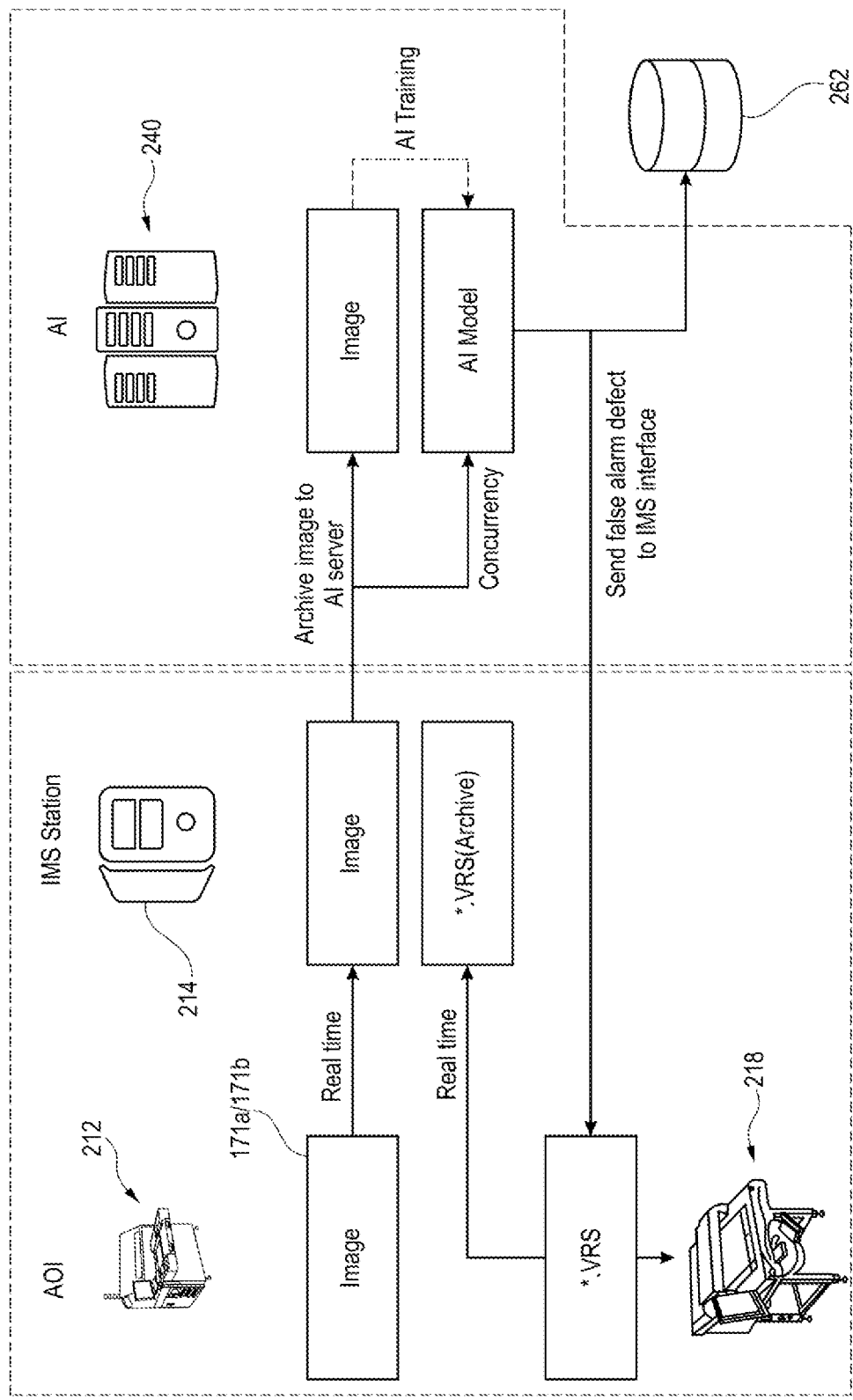
FIG. 3 illustrates the data flow within the system architecture shown in FIG. 2.

FIG. 3 illustrates the data flow within the system architecture 200. The AOI system 212 forwards the captured images in real time to the IMS of the AOI data processing device 214, wherein a (preliminary) AOI defect identification is carried out in a known manner. The corresponding information is added to a data archive file "*. VRS". This archive file "*. VRS" is shared, in a known manner, with the workstation/Verification Repair System (VRS) 218.

As can be taken from FIG. 3, the IMS of the AOI data processing device 214 forwards the captured images together with the (preliminary) information about potential defects of the respective semifinished component carrier to the AI system 240. The AI system 240 performs the above-described AI defect classification. The AI system 240 can be trained in a known manner with data indicating, for previously captured (and AI processed) images, true defects and false defects. According to the embodiment described here, these data are stored as an archive with an appropriate judgement history a on the SQL data storage 262, which is connected to the AI system 240.

All information about false (alarm) defects, which have been identified by the AI system 240, is forwarded (via the not depicted standardized data interface), to the workstation/VRS 218. Based on this information (the operator of) the workstation/VRS 218 can neglect the false defects of the potential defects identified by the AOI system 210 comprising the AOI device 212 and the AOI data processing device 214.

It should be noted that the term "comprising" does not exclude other elements or steps and the use of articles "a" or "an" does not exclude a plurality. Also, elements described in association with different embodiments may be combined.

Implementation of the invention is not limited to the preferred embodiments shown in the figures and described above. Instead, a multiplicity of variants is possible which use the solutions shown and the principle according to the invention even in the case of fundamentally different embodiments.

LIST OF REFERENCE SIGNS

145 AI processing with convolution neural network
147 AI processing with full connect network
149 defect classification
171 first AOI image
171a first illumination
172 second AOI image
172a second illumination
173 virtual third image
180 semifinished component carrier
182 potential defect region
184 data set/grey scale values
200 system architecture
210 AOI system
212 AOI device
214 AOI data processing device/IMS cluster
216 AOI data storage device
218 workstation
220 standardized data interface
230 application system
232 application server
234 client computer
240 AI system
242 AI server
250 control system
252 ERP server
254 Machine Execution System
260 data storage system
262 SQL data storage
264 file server

The invention claimed is:

1. A method for manufacturing and/or for checking and/or for testing a component carrier, the method comprising:
(a) supplying a semifinished component carrier or a component carrier to an automatic or semi-automatic optical inspection device;
(b) performing an automatic or a semi-automatic optical inspection of the semifinished component carrier or the component carrier by means of the automatic or the semi-automatic optical inspection device, wherein performing the automatic or the semi-automatic optical inspection comprises the following steps:

capturing a first image of the semifinished component carrier or the component carrier with a first illumination;

capturing a second image of the semifinished component carrier or the component carrier with a second illumination, the first illumination having a first spectral composition being different to a second spectral composition of the second illumination;

comparing an actual data set being indicative of at least one of the first image and the second image with a reference data set being indicative of a reference image for the semifinished component carrier or the component carrier; and identifying potential defects of the semifinished component carrier or the component carrier based on the result of comparing the actual data set with the reference data set;

(c) carrying out a quality classification of the semifinished component carrier or the component carrier, wherein carrying out the quality classification comprises the following steps:

generating, based on at least one of the first image and the second image, a virtual third image of the semifinished component carrier or the component carrier, wherein the third image is indicative of the semifinished component carrier or the component carrier under a virtual third illumination having a third spectral composition being different both to the first spectral composition and to the second spectral composition;

processing the first image, the second image, and the third image by applying artificial intelligence; and classifying the identified potential defects based on the artificial intelligence processing; and (d) taking an action based on the carried out quality classification.

2. The method as set forth in claim 1, wherein classifying the identified potential defects comprises classifying the identified potential defects in true defects and false defects.

3. The method as set forth in claim 1, wherein the first spectral composition comprises at least one first wavelength, the second spectral composition comprises at least one second wavelength, and the third spectral composition comprises at least one third wavelength which is located, on a wavelength scale, between the first wavelength and the second wavelength.

4. The method as set forth in claim 3, wherein the first spectral composition comprises red light and the second spectral composition comprises blue light.

5. The method as set forth in claim 4, wherein the third spectral composition comprises green light.

6. The method as set forth in claim 1, wherein carrying out the quality classification of the semifinished component carrier or the component carrier further comprises:

after generating the virtual third image and before processing the first image, the second image, and the third image by applying artificial intelligence, transforming pixel values of at least one of the first image, the second image, and the third image, wherein the processing of the first image, the second image, and the third image is carried out with the transformed pixel values.

7. The method as set forth in claim 1, wherein processing the first image, the second image, and the third image is carried out with (i) a first group of first sub-images of the first image, (ii) a second group of second sub-images of the second image, and (iii) a third group of third sub-images of the third image, wherein each sub-image shows at least one identified potential defect.

8. The method as set forth in claim 7, wherein each group of sub-images is assigned to exactly one semifinished component carrier or one component carrier.

9. The method as set forth in claim 7, wherein each sub-image has a pixel size being smaller than 200×200 pixels.

10. The method as set forth in claim 1, further comprising:
classifying the true defects by indicating a type of defect among a number of predefined types of defects.

11. The method as set forth in claim 1, wherein the method is carried out completely without involving the interaction of a human operator.

12. The method as set forth in claim 1, wherein performing the automatic or semi-automatic optical inspection and carrying out the quality classification is done after patterning a metal layer for forming electrically conductor traces of the semifinished component carrier or the component carrier for assessing a quality of the formed conductor traces.

13. The method as set forth in claim 1, wherein processing by applying artificial intelligence and/or processing artificial intelligence comprises updating the processing by data inputted from a user via a user interface device.

14. The method as set forth in claim 1, wherein processing by applying artificial intelligence and/or processing artificial intelligence comprises updating the processing by machine learning, in particular by deep learning.

15. The method as set forth in claim 14, wherein updating the processing by machine learning comprises storing data during processing by machine learning for training the artificial intelligence.

16. A system for handling a semifinished component carrier during manufacturing of a component carrier, the system comprising:

(a) a device for supplying a semifinished component carrier or a component carrier to an automatic or semi-automatic optical inspection device;

(b) the automatic or semi-automatic optical inspection device for performing an automatic or semi-automatic optical inspection of the semifinished component carrier or the component carrier, wherein the automatic or semi-automatic optical inspection device is configured for:

capturing a first image of the semifinished component carrier or the component carrier with a first illumination;

capturing a second image of the semifinished component carrier or the component carrier with a second illumination, the first illumination having a first spectral composition being different to a second spectral composition of the second illumination;

comparing an actual data set being indicative of at least one of the first image and the second image with a reference data set being indicative of a reference image for the semifinished component carrier or the component carrier; and identifying potential defects of the semifinished component carrier or the component carrier based on the result of comparing the actual data set with the reference data set;

(c) a data processing device, communicatively coupled with the automatic or semi-automatic optical inspection device, for carrying out a quality classification of the semifinished component carrier, wherein the data processing device is configured for generating, based on at least one of the first image and on the second image, a virtual third image of the semifinished component carrier, wherein the third image is indicative of the semifinished component carrier or the component carrier under a virtual third illumination having a third spectral composition being different both to the first spectral composition and to the second spectral composition;

processing the first image, the second image, and the third image by applying artificial intelligence; and classifying the identified potential defects in true defects and false defects based on the artificial intelligence processing; and (d) an executing device for taking an action based on the carried out quality classification.

17. A system architecture for classifying defects of a semifinished component carrier during manufacturing of a component carrier, the system architecture comprising:

(a) an automatic or semi-automatic optical inspection system for performing an automatic or semi-automatic optical inspection of the semifinished component carrier, wherein the automatic or semi-automatic optical inspection system comprises an automatic or semi-automatic optical inspection device configured for capturing at least one image of the semifinished component carrier or the component carrier, and a data processing device configured for (i) receiving the at least one captured image, (ii) comparing an actual data set being indicative of the at least one captured image with a reference data set being indicative of a reference image for the semifinished component carrier or the component carrier, and (iii) identifying potential defects of the semifinished component carrier (180) or the component carrier based on the result of comparing the actual data set with the reference data set;

(b) a standardized data interface;

(c) an application system comprising at least one application server, which is communicatively coupled with the automatic or semi-automatic optical inspection system via the standardized data interface for exchanging image information relating to the at least one captured image and to the identified potential defects, wherein the at least one application server is configured for processing the image information;

(d) an artificial intelligence system comprising at least one artificial intelligence server, which is communicatively coupled with the application system for exchanging the image information with the application server, wherein the at least one artificial intelligence server is configured for (i) processing the exchanged image information, (ii) classifying, based on artificial intelligence processing, the identified potential defects into true defects and false defects, and (iii) exchanging information about true defects and false defects at least with the application server; and (e) a control system, which is communicatively coupled with the application system and which is configured for (i) storing identity information of a plurality of individual semifinished component carriers or individual component carriers, (ii) receiving automatic optical inspection measurement results or semi-automatic inspection measurement results at least for the semifinished component carrier or the component carrier, wherein the automatic optical inspection measurement results or the semi-automatic inspection measurement results include information about the identified potential defects, (iii) receiving the information about true defects and false defects at least for the semifinished component carrier or the component carrier, and (iv) assigning the received automatic optical inspection measurement results and the received information about true defects and false defects to the stored identity information.

18. The system architecture as set forth in claim 17, further comprising:

a data storage system, which is communicatively coupled with the application system and which is configured for storing labeled image information for a plurality of semifinished component carriers, wherein each labeled image information comprises (i) the image information relating to the at least one captured image and to the identified potential defects and (ii) label information being indicative, for each identified potential defect, whether it is a false defect.

19. The system architecture as set forth in claim 18, wherein the automatic optical inspection system further comprises an automatic optical inspection data storage device for storing, for each of a plurality of captured images, the associated label information received from the data storage system.

* * * * *